United States Patent Office 3,286,442
Patented Nov. 22, 1966

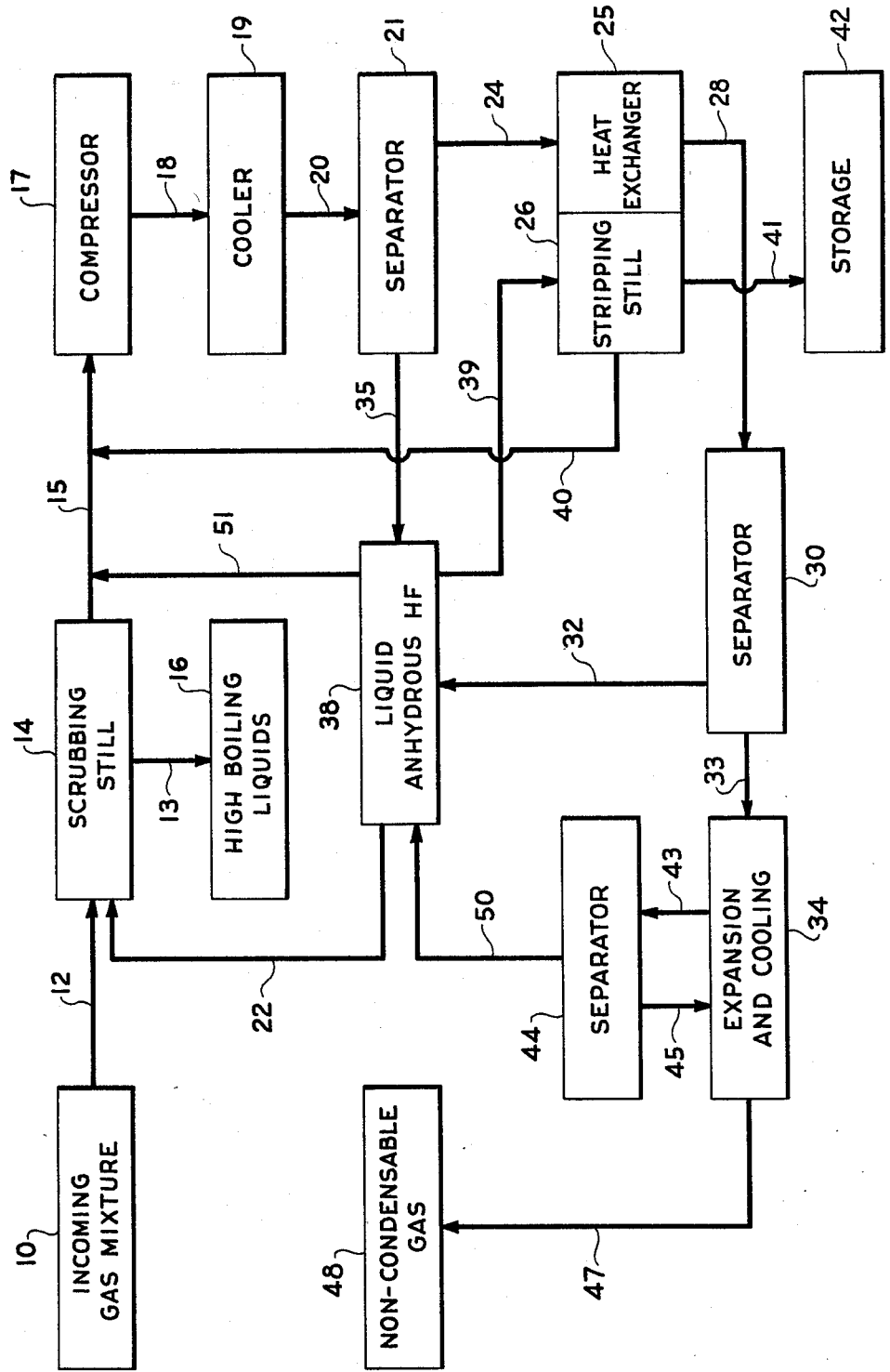

3,286,442
CONDENSATION OF HYDROGEN FLUORIDE FROM NON-CONDENSABLE DILUENTS
Joseph J. Wyiegala, Grand Island, N.Y., assignor to Hooker Chemical Corporation, Niagara Falls, N.Y., a corporation of New York
Filed May 27, 1964, Ser. No. 370,413
3 Claims. (Cl. 55—23)

This invention relates to a method of condensing and separating hydrogen fluoride from a mixed gas. More particularly, this invention relates to a continuous process of condensing and separating anhydrous hydrogen fluoride from a mixture of non-condensable gases.

Hydrogen fluoride is a useful chemical reactant for the formation of various fluorine compounds. As such, it is preferably used in an anhydrous state although, because of its reactivity and the sources from which it is obtained, it is often isolated in such state by numerous and often complex separation processes.

In recent years, hydrogen fluoride has been recovered from waste or flue gases containing minor percentages of fluorine. Since most volatile and soluble fluorine values, particularly as hydrogen fluoride, are extremely corrosive, toxic and odoriferous, it is highly desirable to remove them from waste gases prior to venting to the atmosphere. The depleting supply of hydrogen fluoride from conventional sources, such as the calcination or acidulation of fluorspar and chryolite, and the increasing demand for hydrogen fluoride, has made it economically attractive to recover, as anhydrous hydrogen fluoride, the minor percentages of fluorine contained in certain waste gases. This increased demand for anhydrous hydrogen fluoride has resulted in the need for new and better methods of separating it from various mixtures in which it has been concentrated after being recovered from the waste gases.

It is an object of this invention to provide a method of separating anhydrous hydrogen fluoride from non-condensable gases. Another object of this invention is to provide a method of separating anhydrous hydrogen fluoride from silicon tetrafluoride. A further object of this invention is to provide a method of condensing and isolating hydrogen fluoride with a minimum amount of pressure and a minimum of external cooling.

The objects of this invention are accomplished by the process which comprises scrubbing a non-condensable gas stream containing hydrogen fluoride by contacting it with liquid hydrogen fluoride, cooling the gas stream, compressing the gas mixture, removing the heat generated in compressing, and separating liquefied hydrogen fluoride from the compressed gas.

The invention is further defined as a process which comprises scrubbing a non-condensable gas stream containing hydrogen fluoride by contacting it with liquid hydrogen fluoride, cooling the gas stream, fractionally distilling and removing high bailing condensates, compressing the gas mixture, removing heat generated in compressing, separating liquefied hydrogen fluoride from the compressed gas, further cooling and expanding the compressed gas using the expanded and cooled gas as an indirect cooling means and separating the additional hydrogen fluoride liquefied from the uncondensed gas.

The present procedure provides a simplified process of separating and condensing anhydrous hydrogen fluoride from a gas stream without requiring freezing units or high pressures. The circulation of ordinary cooling water is sufficient to remove the heat generated and to cause liquefaction of the hydrogen fluoride and separation of noncondensable gases therefrom.

In addition to condensing hydrogen fluoride from a gas to a liquid, this invention provides a means of fractionally separating hydrogen fluoride from high boiling and low boiling constituents of the gas stream. The high boiling constituents may be water, sulfuric acid when used in previous processing and the like. The low boiling constituents are the non-condensable gases.

The term non-condensable gas defines gases which condense below the temperatures and at greater pressures than required to condense hydrogen fluoride and in addition, are relatively insoluble in liquid hydrogen fluoride. Such gases include silicon tetrafluoride, nitrogen, hydrogen, oxygen, the inert and rare gases and the like. These gases are further described as those being relatively insoluble in hydrogen fluoride at −20 degrees centigrade and having a boiling point less than −20 degrees centigrade at atmospheric pressure.

The gas stream used in the process of this invention is derived from any of several recovery and concentration procedures used in the isolation of hydrogen fluoride from fluorine values. One such process is the acidulation of sodium silicofluoride ($Na_2SiF_6$) with concentrated sulfuric acid. The acidulation process decomposes sodium silicofluoride by the reaction:

$$Na_2SiF_6 + H_2SO_4 \text{ (concentrated)} \longrightarrow 2HF\uparrow + SiF_4\uparrow + Na_2SO_4$$

The decomposition yields two gases, e.g., hydrogen fluoride and silicon tetrafluoride, which are normally difficultly separable but are readily separated by the process of this invention. Sodium silicofluoride is conveniently obtained by reacting with sodium sulfate the fluosilicic acid formed by aqueous scrubbing of waste gases from such processes as the acidulation of phosphate rock and various electrolysis and calcinating processes.

Another source of hydrogen fluoride in a non-condensable gaseous mixture is provided by again using the fluorine values absorbed by aqueous scrubbing of waste gases, ammoniating the scrubber lifuor and isolating the fluorine values as ammonium bifluoride. Ammonium bifluoride is subsequently pyrolyzed at a temperature of 230 degrees centigrade to 1000 degrees centigrade to form a gaseous mixture of hydrogen fluoride, hydrogen and nitrogen. The pyrolysis proceeds by the reaction:

$$2NH_4HF_2 \xrightarrow{\Delta} 4HF\uparrow + N_2\uparrow + 3H_2\uparrow$$

The resulting gaseous mixture of hydrogen fluoride and non-condensable gases is readily separated by the process of this invention.

A further source of hydrogen fluoride in a non-condensable gaseous mixture is provided by again using the fluosilicic acid formed by the aqueous scrubbing of waste gases. Fluosilicic acid is heated to above its azeotropic boiling point, the azeotrope being fractionally separated and routed through a sulfuric acid dehydration unit to remove the water in the azeotrope and to form a mixture of hydrogen fluoride and silicon tetrafluoride. The reaction may be stated as:

$$H_2SiF_6 + H_2O \xrightarrow{\Delta}$$

$$2HF \cdot SiF_4 + H_2O \xrightarrow{H_2SO_4} 2HF\uparrow + SiF_4\uparrow + H_2SO_4 \cdot H_2O$$

The resulting gaseous mixture of hydrogen fluoride and silicon tetrafluoride which is normally separated with difficulty is readily separated by the process of this invention.

The sources of hydrogen fluoride in admixture with a non-condensable gas as described, may also be obtained by other processes not described herein. Those skilled in the art will readily recognize such equally applicable processes which provide a gaseous stream of hydrogen fluoride and a non-condensable gas. Gas streams from such processes are also intended to be included as gas streams separable by the process of this invention.

The gas stream comprising hydrogen fluoride and a non-condensable gas usually is more than 10 mole percent of hydrogen fluoride. It should be 20 percent or more of hydrogen fluoride on a molar basis for low pressure operations. Therefore, the non-condensable gas comprises up to about 90 mole percent of the gaseous mixture. Typical gaseous mixtures include 65 mole percent hydrogen fluoride and about 35 mole percent silicon tetrafluoride; 50 mole percent hydrogen fluoride; 12½ mole percent nitrogen and 37½ mole percent hydrogen; and like mixtures, which may also contain minor proportions of water and other higher boiling condensables.

The present invention is readily decribed by reference to the drawing, which is a flowsheet of the process of this invention.

Incoming gas mixture 10 comprising hydrogen fluoride and a non-condensable gas or relatively pure hydrogen fluoride is conveyed by line 12 to scrubbing still 14. Scrubbing still 14 performs the function of cooling the incoming gas mixture 10 and condensing high boiling liquids 16. Scrubbing still 14 passes the incoming gas 10 countercurrent to liquid hydrogen fluoride entering from line 22 effecting direct contact and intimate mixing of the liquid and gas. The liquid hydrogen fluoride is used in sufficient quantity to cool the incoming gas so as to lower the gas temperature to about the condensation temperature of hydrogen fluoride, e.g., 19.5 degrees centigrade, or less. In gaseous mixtures, however, the condensation temperature of hydrogen fluoride is lower, e.g., 5 to 20 degrees centigrade depending on the mixture. The evaporation of the liquid hydrogen fluoride also facilitates the lowering of the temperature of the gas stream.

The gaseous mixture containing the additional amount of hydrogen fluoride vaporized in cooling the incoming gas, passes through line 15 to compressor 17. The gases are there compressed to a pressure of about 5 to about 15 atmospheres. The compressed gases pass by means of line 18 to cooler 19 where the heat (generated during compression) is removed. Cooler 19 operates with ordinary cooling water or other means capable of removing the heat of the compressed gases and lowering the temperature from about 10 degrees centigrade to about 50 degrees centigrade. Normally the temperature is not lowered to as low as that of gases coming into the compressor. The cooled gases contain a major proportion of hydrogen fluoride in liquefied form. The mixture is thereafter conveyed by line 20 to separator 21 for the separation of liquified hydrogen fluoride which is transferred via line 35 to the liquid anhydrous hydrogen fluoride tank 38. On entering tank 38 liquid hydrogen fluoride passes through a throttling valve and its pressure is lowered to atmospheric pressure causing a further cooling. Blow-by gasses created on the release of the pressure are vented by line 51 to line 15 for recycle.

The gases separated in separator 21 are conveyed under pressure by line 24 to heat exchanger 25. Heat exchanger 25 alternately may be by-passed and line 24 may be routed directly to expansion and cooling tank 34. Heat exchanger 25 is used as a heat source for redistilling hydrogen fluoride liquid so as to remove any lower boiling liquids which may have been absorbed therein. Stripping still 26 passes liquid hydrogen fluoride from tank 38 by means of line 39 through still 26 in indirect heat transfer relation effecting the removal of low boiling gases which may have been absorbed in the hydrogen fluoride. The low boiling gases normally are present in minor amounts and comprise the non-condensable gases. These gases are removed from still 26 via line 40 and are recycled through line 15. Liquid hydrogen fluoride passing through still 26 is removed via line 41 to storage 42.

The gaseous mixture passing through heat exchanger 25 is conveyed by line 28 under pressure to separator 30. The temperature of the gaseous mixture is further lowered in heat exchanger 25, causing the condensation of an additional amount of liquid hydrogen fluoride. The liquid is separated in separator 30 and is conveyed by line 32 to liquid anhydrous hydrogen fluoride tank 38. The non-condensed gaseous mixture, still under pressure, is conveyed by line 33 to expansion and cooling area 34.

The expansion and cooling procedure utilizes the expanding and expanded gaseous mixture to cool the incoming compressed gases. After being further cooled, the incoming gases pass through a throttling valve releasing the pressure and returning to atmospheric pressure, thereby effecting a further cooling. The further cooling condenses most of the remaining hydrogen fluoride in the gaseous mixture. The cooling effected by passing through the throttling valve and expanding causes a lowering of the temperature to about 0 to about −30 degrees centigrade. The gases and additional condensed hydrogen fluoride pass through line 43 to separator 44 for separation of the condensed hydrogen fluoride. Liquid hydrogen fluoride is passed from separator 44 via line 50 to liquid anhydrous fluoride tank 38. The cold non-condensed gases pass from separator 44 via line 45 to expansion and cooling area 34 to cool additional incoming pressurized gases from line 33. The non-condensed gases are then vented via line 47 for further processing or recycling. These gases will contain a minor amount of hydrogen fluoride not exceeding about 10 mole percent.

The invention will be better understood with reference to the following examples which are illustrations of certain preferred embodiments of the present invention. Unless otherwise indicated all temperatures are in degrees centigrade and all parts and percentages used herein are by weight.

EXAMPLE 1

This example illustrates the heat absorption required for the condensation of hydrogen fluoride from a gaseous mixture comprising 2 moles of hydrogen fluoride per mole of silicon tetrafluoride.

A gaseous mixture at a temperature of 100 degrees centigrade having a mole ratio of 2 moles hydrogen fluoride per mole of silicon tetrafluoride was separated and the hydrogen fluoride recovered as liquid hydrogen fluoride by the method of this invention. The gaseous mixture was passed through a scrubbing still countercurrent to liquid hydrogen fluoride at a temperature of 19.5 degrees centigrade. The passing of 3 moles of the gaseous mixture through the scrubbing still volatilized 9.75 moles of liquid hydrogen fluoride and cooled the gaseous mixture to 12 degrees centigrade at 1 atmosphere pressure. A minor amount of water was condensed during the scrubbing operation and was removed from the bottom of the still. The input of liquid hydrogen fluoride into the scrubbing still was maintained so as to completely volatilize all of the liquid in the cooling of the incoming gases. The gases exiting from the scrubbing still had a mole ratio of 11.75 hydrogen fluoride to 1 silicon tetrafluoride. These gases were then compressed to 10 atmospheres pressure and were passed through a water-box condenser, cooling the mixture to 45 degrees centigrade. The compression step resulting in the input of mechanical work equal to 8550 calories per 12.75 moles of gas. The cooling operation removed 22,930 calories of heat per 12.75 moles of gas.

The cooling caused a condensation of most of the liquid hydrogen fluoride which was removed by passing the liquid-gas mixture through a separator. Liquid hydrogen fluoride at 45 degrees centigrade under 10 atmospheres of pressure was conveyed to a liquid storage tank and was passed through a throttling valve to reduce the pressure to atmospheric. The reduction to atmospheric pressure caused a further cooling of the liquid by vaporization of about one-third of the liquid hydrogen fluoride passing through the throttling valve. The vaporized hydrogen fluoride was recycled through the compressor.

The gas passing through the separator was retained at 10 atmospheres pressure and 45 degrees centigrade. The gas now had a mole ratio of 0.94 hydrogen fluoride to 1 silicon tetrafluoride. This gas stream was then passed through a cooling tower and was expanded by passing through a throttling valve and reducing the pressure to atmospheric. The gases and liquid exiting from the throttling valve were at a temperature of −10 degrees centigrade. The additionally condensed hydrogen fluoride was separated from the gas and conveyed to the storage unit. The remaining gas was routed from the separator through the cooling tower in indirect heat transfer relation so as to function as a coolant for the compressed gases prior to expansion thereof. The gases used as the coolant for the cooling tower had a mole ratio of 0.1 hydrogen fluoride per mole of silicon tetrafluoride. These gases were then removed from the process.

EXAMPLE 2

This example illustrates the redistillation of liquid hydrogen fluoride condensed and separated from non-condensable gases by the process of this invention to remove the minor traces of non-condensable gases so as to obtain a highly purified anhydrous hydrogen fluoride liquid.

The process of Example 1 was repeated, commencing with a similar hydrogen fluoride-silicon tetrafluoride gaseous mixture at 100 degrees centigrade. The gas mixture was passed through the scrubbing still countercurrent to and in direct contact with liquid hydrogen fluoride effecting a cooling to 12 degrees centigrade. The cooled gases and additional hydrogen fluoride volatilized were passed to a compressor for compression to 10 atmospheres. The compressed gases were then cooled to 45 degrees centigrade and the condensed liquid hydrogen fluoride (I) separated therefrom.

The remaining gases (II) at a temperature of 45 degrees centigrade and under 10 atmospheres pressure, had a mole ratio of 0.94 mole of hydrogen fluoride per mole of silicon tetrafluoride. These gases (II) were passed through a heat exchanger providing the heat for a stripping still for liquid hydrogen fluoride. Previously separated liquid hydrogen fluoride (I) was passed from a holding tank through the stripping still in indirect heat transfer relation to the gas mixture (II), causing a volatilization of about one-third of the liquid hydrogen fluoride (I) and a further distillation and cooling of the liquid hydrogen fluoride (I). The redistillation of the hydrogen fluoride (I) removed traces of low boiling non-condensable gases. In addition, the compressed gaseous mixture (II) passing through the heat exchanger provided heat for the still and in so doing was further cooled to 19.5 degrees centigrade effecting an additional condensation of liquid hydrogen fluoride.

The gaseous mixture (II), exiting from the heat exchanger, passed through a separator where additional liquid hydrogen fluoride was removed. The gases passing through the separator were then passed through a cooling tower prior to reducing the pressure to atmospheric by passing through a throttling valve. In passing through the throttling valve, the gas was lowered to atmospheric pressure with a resulting cooling to −20 degrees centigade. Again liquid hydrogen fluoride was separated from the gaseous mixture. The remaining gaseous mixture was passed through the cooling tower in indirect heat transfer relation as a cooling means for the pressurized gases. The non-condensed gases passing through the cooling tower at atmospheric pressure comprised approximately 90 mole percent silicon tetrafluoride and 10 mole percent hydrogen fluoride.

EXAMPLE 3

This example illustrates the condensation of hydrogen fluoride from a gas stream comprising the decomposition products of ammonium bifluoride, wherein the ammonia constituent was pyrolyzed to the elements hydrogen and nitrogen. This gas mixture contained a mole ratio of 4 moles of hydrogen fluoride, 1 mole of nitrogen and 3 moles of hydrogen.

Gases in the mole ratio described at a temperature of 126 degrees centigrade were conveyed to a scrubbing still operated at atmospheric pressure. Sufficient liquid hydrogen fluoride was passed in contact with and countercurrent to the incoming gases so as to cool the gases and substantially volatilize the liquid hydrogen fluoride. Sufficient liquid hydrogen fluoride was used to cool the incoming gases to 18 degrees centigrade. The cooled gases, in addition to the liquid hydrogen fluoride volatilized, were then compressed to 10 atmospheres pressure and passed through a cooling zone to remove the heat generated in the compression step. The temperature was lowered to 40 degrees centigrade. The cooling of the compressed gases liquefied a major proportion of the hydrogen fluoride present. Liquid hydrogen fluoride was separated from the gaseous mixture and passed through a throttling valve causing a further lowering of the temperature of the liquid and a partial vaporization of the liquid in reducing the pressure to atmospheric. The hydrogen fluoride volatilized during the reduction of pressure was recycled through the compressor.

The gases passing through the separator were conducted to a cooling tower where they were cooled to approximately 0 degrees centigrade and subsequently were passed through a throttling valve so as to reduce the pressure to atmospheric and further cool the gas mixture. Additional hydrogen fluoride condensed during this operation and was separated. The non-condensed gases were passed through the cooling tower in an indirect heat exchange relation and were used as coolant for the cooling tower. The gases passing through the cooling tower comprised principally hydrogen and nitrogen, containing less than 10 percent hydrogen fluoride.

While there have been described various embodiments of this invention, the methods described are not intended to be understood as limiting the scope of this invention. It is realized that changes therein are possible and it is further intended that each element recited in any of the following claims is to be understood as referring to all equivalent elements for accomplishing substantially the same results in substantially the same or equivalent manner. It is intended to cover the invention broadly in whatever form its principle may be utilized.

What is claimed is:

1. A method of condensing hydrogen fluoride in a non-condensable gas stream comprising scrubbing a non-condensable gas stream containing hydrogen fluoride by contacting it with liquid hydrogen fluoride, cooling the gas stream by said contact while vaporizing hydrogen fluoride gas from the liquid hydrogen fluoride with which the said gas stream is contacted, combining the thus-vaporized hydrogen fluoride with the said gas stream in the zone of contact with the liquid hydrogen fluoride, fractionally distilling the resulting mixture of gas and liquid and removing high boiling condensates therefrom, compressing the gas mixture, removing heat generated in compressing, separating liquefied hydrogen fluoride from the compressed gas, further cooling and expanding the compressed gas using the expanded and cooled gas as an indirect cooling means for the said compressed gas and separating the additional hydrogen fluoride liquefied from the uncondensed gas.

2. A method of condensing hydrogen fluoride in a non-condensable gas stream comprising scrubbing with liquid hydrogen fluoride a hot non-condensable gas stream containing hydrogen fluoride, cooling the gas stream to less than about 20 degrees centigrade while volatizing liquid hydrogen fluoride used in the scrubbing, separating condensed higher boiling liquids from the gases, compressing the gas stream to about 5 to 20 atmospheres, removing the heat generated in compression, separating liquefied hydrogen fluoride from the compressed gas, further cooling and expanding the compressed gas to less than about 0 degrees centigrade, using the expanded gas as an indirect cooling means and separating the additional hydrogen fluoride liquefied from the uncondensed gas.

3. A method of condensing hydrogen fluoride in a non-condensable gas stream which comprises scrubbing a non-condensable gas stream containing hydrogen fluoride by contacting it with liquid hydrogen fluoride, cooling the gas stream by said contact while vaporizing hydrogen fluoride gas from the liquid hydrogen fluoride with which the said gas stream is contacted, combining the thus-vaporized hydrogen fluoride gas with the said gas stream in the zone of contact with the said liquid hydrogen fluoride, fractionating the resulting mixture of gas and liquid, separating high boiling condensates therefrom, compressing the resulting gas mixture from which the high boiling condensates have been removed, removing heat generated in compressing, and separating liquified hydrogen fluoride from the compressed gas.

References Cited by the Examiner
UNITED STATES PATENTS

| | | | |
|---|---|---|---|
| 2,507,605 | 5/1950 | Lopker et al. | 23—153 |
| 3,004,829 | 10/1961 | Boyle et al. | 23—153 |
| 3,128,152 | 4/1964 | Secord et al. | 23—153 |
| 3,167,391 | 1/1965 | Swinehart | 55—71 X |

REUBEN FRIEDMAN, *Primary Examiner.*

J. W. ADEE, *Assistant Examiner.*